US010580539B2

(12) United States Patent
Singh et al.

(10) Patent No.: US 10,580,539 B2
(45) Date of Patent: Mar. 3, 2020

(54) NUCLEAR REACTOR SHROUD

(71) Applicant: SMR INVENTEC, LLC, Camden, NJ (US)

(72) Inventors: Krishna P. Singh, Hobe Sound, FL (US); Indresh Rampall, Cherry Hill, NJ (US); Joseph Gerald Leo Rajkumar, Cherry Hill, NJ (US)

(73) Assignee: SMR INVENTEC, LLC, Camden, NJ (US)

(*) Notice: Subject to any disclaimer, the term of this patent is extended or adjusted under 35 U.S.C. 154(b) by 372 days.

(21) Appl. No.: 15/715,631

(22) Filed: Sep. 26, 2017

(65) Prior Publication Data

US 2018/0068751 A1 Mar. 8, 2018

Related U.S. Application Data

(62) Division of application No. 14/771,018, filed as application No. PCT/US2014/019042 on Feb. 27, 2014, now Pat. No. 9,773,576.

(60) Provisional application No. 61/770,213, filed on Feb. 27, 2013.

(51) Int. Cl.
*G21C 15/24* (2006.01)
*G21C 13/02* (2006.01)
*G21C 15/243* (2006.01)
*G21C 9/04* (2006.01)

(52) U.S. Cl.
CPC .............. *G21C 15/24* (2013.01); *G21C 13/02* (2013.01); *G21C 15/243* (2013.01); *G21C 9/04* (2013.01); *Y02E 30/40* (2013.01)

(58) Field of Classification Search
CPC ..... G21C 11/085; G21C 13/02; G21C 15/243; G21C 9/04
See application file for complete search history.

(56) References Cited

U.S. PATENT DOCUMENTS

| 2,399,714 A | 5/1946 | Wasilewski |
| 3,124,514 A | 3/1964 | Koutz et al. |
| 3,146,173 A | 8/1964 | Fortescue et al. |

(Continued)

FOREIGN PATENT DOCUMENTS

| JP | 03039692 A | * | 2/1991 |
| JP | 2008134102 | | 6/2008 |

OTHER PUBLICATIONS

Kris Singh et al: "On the Thermal-Hydraulic Essentials of the Holtec Inherently Safe Modular Underground Reactor (HI-SMUR) System", ASME 2011 Small Modular Reactors Symposium, Jan. 1, 2011, pp. 95-106.

*Primary Examiner* — Lily C Garner
(74) *Attorney, Agent, or Firm* — The Belles Group, P.C.

(57) ABSTRACT

A nuclear reactor in one embodiment includes a cylindrical body having an internal cavity, a nuclear fuel core, and a shroud disposed in the cavity. The shroud comprises an inner shell, an outer shell, and a plurality of intermediate shells disposed between the inner and outer shells. Pluralities of annular cavities are formed between the inner and outer shells which are filled with primary coolant such as demineralized water. The coolant-filled annular cavities may be sealed at the top and bottom and provide an insulating effect to the shroud. In one embodiment, the shroud may comprise a plurality of vertically-stacked self-supported shroud segments which are coupled together.

16 Claims, 8 Drawing Sheets

(56) References Cited

U.S. PATENT DOCUMENTS

| | | | | |
|---|---|---|---|---|
| 3,489,206 | A | * | 1/1970 | Lecourt ................ G21C 11/085 |
| | | | | 165/104.31 |
| 3,785,924 | A | * | 1/1974 | Notari .................. G21C 11/085 |
| | | | | 376/287 |
| 3,939,804 | A | | 2/1976 | Barratt |
| 4,039,377 | A | | 8/1977 | Andrieu et al. |
| 40,173,685 | | | 2/1978 | Brown et al. |
| 4,163,470 | A | | 8/1979 | Johnsen et al. |
| 4,812,286 | A | | 3/1989 | Giuntz |
| 5,087,409 | A | | 2/1992 | Wedellsborg et al. |
| 5,443,802 | A | * | 8/1995 | Freedman ................ A61L 2/07 |
| | | | | 422/111 |
| 5,737,379 | A | * | 4/1998 | Erbes ..................... G21C 13/02 |
| | | | | 376/302 |
| 5,963,611 | A | | 10/1999 | Narabayashi et al. |
| 6,009,137 | A | | 12/1999 | Matsumoto et al. |
| 6,064,710 | A | | 5/2000 | Singh |
| 6,264,203 | B1 | * | 7/2001 | Weems .................. G21C 15/25 |
| | | | | 277/314 |
| 2010/0272225 | A1 | | 10/2010 | Singh |

\* cited by examiner

NUCLEAR REACTOR SHROUD

CROSS-REFERENCE TO RELATED APPLICATIONS

The present application is a divisional of U.S. patent application Ser. No. 14/771,018 filed Aug. 27, 2015, which is a U.S. national stage application under 35 U.S.C. § 371 of International Patent Application No. PCT/US2014/019042 filed Feb. 27, 2014, which claims the benefit of U.S. Provisional Patent Application Ser. No. U.S. 61/770,213 filed Feb. 27, 2013; the entireties of which are incorporated herein by reference.

FIELD OF THE INVENTION

The present invention relates to nuclear reactor vessels, and more particularly to a nuclear reactor shroud surrounding the fuel core.

BACKGROUND OF THE INVENTION

Many nuclear reactor designs are of circulatory type wherein the water heated in the reactor fuel core region must be separated from the cooler water outside of it. Such a nuclear reactor may be typically equipped with a cylindrical shroud around the fuel core. The shroud serves to separate the internal space in the reactor vessel between an "up-flow" (e.g. riser) region in which primary coolant heated by the core flows inside the shroud and the "downcomer" region in which colder primary coolant returned to the reactor vessel from the Rankine cycle steam generating system flows outside the shroud. It is desirable to minimize heat transfer from the heated hot reactor water inside the riser region of the shroud to the colder downcomer water outside the shroud which is deleterious to the thermodynamic performance of the reactor.

The standard practice in shroud design has typically consisted of hermetically enclosing a fibrous or ceramic insulation in a stainless steel (or another corrosion resistant alloy) enclosure. Such a shroud works well until a leak in the enclosure develops, usually caused by the thermal stresses and strains that are inherent to any structure operating under a temperature differential. Concerns regarding failure of the shroud and subsequent dismembering of the insulation have been a source of significant and expensive ameliorative modification efforts in many operating reactors.

SUMMARY OF THE INVENTION

The present disclosure provides a reactor shroud which minimizes heat transfer between the hot reactor riser water and cold downcomer water in a manner which eliminates drawbacks of the foregoing insulated enclosure designs. In an embodiment of the present invention, the shroud may be comprised of a series of concentric cylindrical shells separated by a small radial clearance. The top and bottom extremities of the shells are each welded to common top and bottom annular plates ("closure plates") to create an essentially isolated set of narrow & tall annular cavities. Each cavity is connected to its neighbor by one or more small drain holes such that submerging the multi-shell body in water (e.g. demineralized primary coolant in a reactor vessel) would fill all of the internal cavities with water and expel virtually all entrapped air, thereby creating water-filled annular cavities.

In one non-limiting embodiment, the thin walled concentric shells may be buttressed against each other with a prescribed gap by small fusion welds made by a suitable process such as spot, plug, or TIG welding. In such a welding process, a small piece of metal (e.g. spacer) equal in thickness to the radial gap or clearance in the cavity serves to enable a fusion nugget to be created between the two shell walls. The number of such nuggets is variable, but preferably is sufficient to prevent flow induced vibration of the shroud weldment during reactor operation.

One principal advantage of the multi-shell closed cavity embodiment described herein is that it is entirely made of materials native to the reactor's internal space, namely demineralized water (e.g. primary coolant) disposed within the radial gaps between the concentric shells and metal such as stainless steel. No special insulation material of any kind is used in the reactor shroud (which may degrade and fail over time). Advantageously, the present shroud design provides the desired heat transfer minimization between the hot reactor water inside the riser region of the shroud to the colder downcomer water outside the shroud without insulation, thereby preserving the thermodynamic performance of the reactor.

According to one exemplary embodiment, a nuclear reactor vessel includes an elongated cylindrical body defining an internal cavity containing primary coolant water; a nuclear fuel core disposed in the internal cavity; an elongated shroud disposed in the internal cavity, the shroud comprising an inner shell, an outer shell, and a plurality of intermediate shells disposed between the inner and outer shells; and a plurality of annular cavities formed between the inner and outer shells, the annular cavities being filled with the primary coolant water. In one embodiment, the annular cavities are fluidly interconnected by a plurality of drain holes allowing the primary coolant to flow into and fill the cavities from the reactor vessel.

According to another embodiment, a shroud segment for a nuclear reactor vessel includes an elongated inner shell; an elongated outer shell; a plurality of elongated intermediate shells disposed between the inner and outer shells; the inner shell, outer shell, and intermediate shells being radially spaced apart forming a plurality of annular cavities for holding water; a top closure plate attached to the top of the shroud segment; and a bottom closure plate attached to the bottom of the shroud segment, wherein the top and bottom closure plates are configured for coupling to adjoining shroud segments to form a stacked array of shroud segments.

A method for assembling a shroud for a nuclear reactor vessel is provided. The method includes: providing a first shroud segment and a second shroud segment, each shroud segment including a top closure plate and a bottom closure plate; abutting the top closure plate of the second shroud segment against the bottom closure plate of the first shroud segment; axially aligning a first mounting lug on the first shroud segment with a second mounting lug on the second shroud; and locking the first mounting lug to the second mounting lug to couple the first and second shroud segments together. In one embodiment, the locking step is preceded by pivoting a mounting clamp attached to the first shroud segment from an unlocked open position to a locked closed position.

BRIEF DESCRIPTION OF THE DRAWINGS

The features of the exemplary embodiments of the present invention will be described with reference to the following drawings, where like elements are labeled similarly, and in which.

Figure 1:
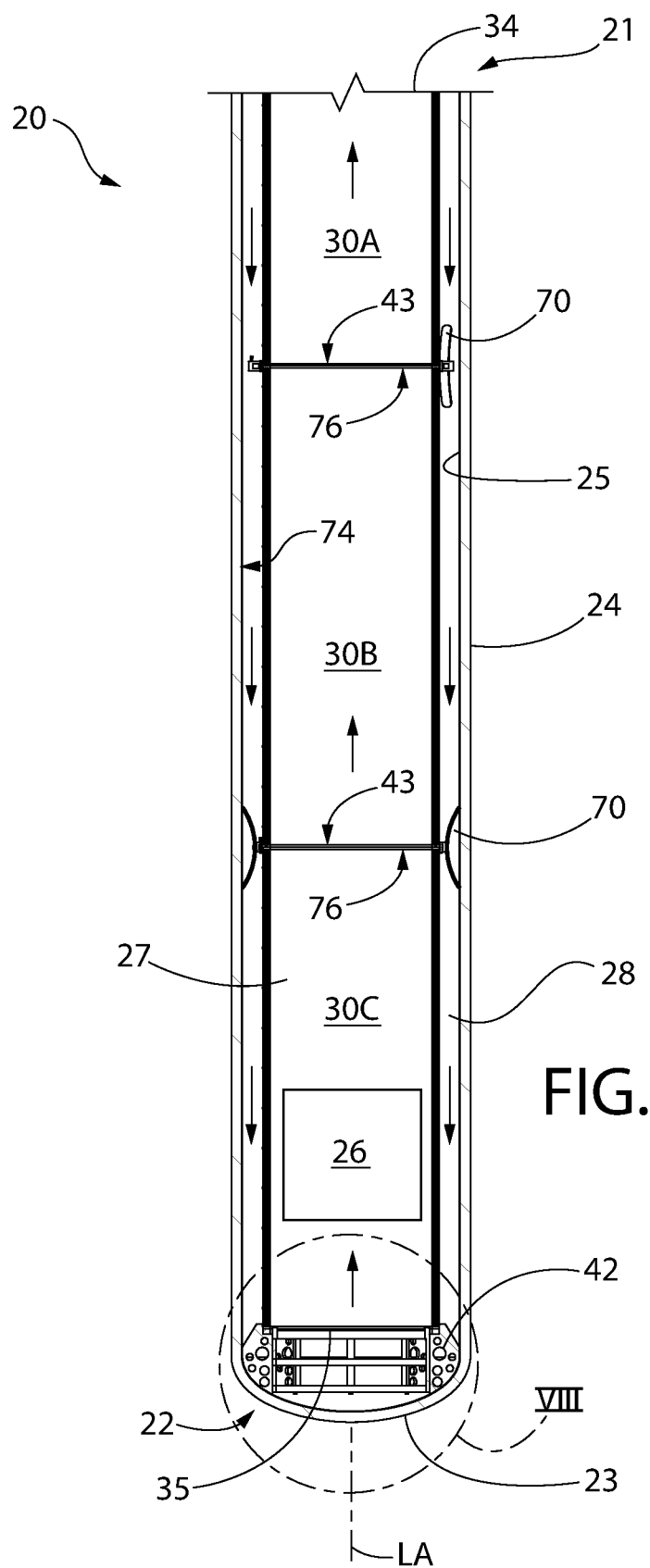
FIG. 1 is a longitudinal cross sectional view of a nuclear reactor with shroud surrounding the fuel core according to the present disclosure.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE EMBODIMENTS

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Referring to FIG. 1, a reactor vessel 20 includes a vertically elongated cylindrical body defining a longitudinal axis LA and having a top 21, closed bottom 22, and a circumferentially extending sidewall 24 extending between the top and bottom. Sidewall 24 defines an internal cavity 25 configured for holding a nuclear fuel core 26. Internal cavity extends axially along the longitudinal axis from the top 21 to the bottom 22 of the reactor vessel 20 in one embodiment. The bottom 22 may be closed by a lower head 23, which may be without limitation dished or hemispherical in configuration. In one embodiment, the internal cavity 25 may be filled with a liquid such as primary coolant which may be demineralized water. The reactor vessel 20 may be made of any suitable metal, including without limitation coated steel or stainless steel for corrosion resistance.

Referring to FIGS. 1-3 and 7, a vertically elongated shroud 30 is provided which is disposed in the internal cavity 25 of the reactor vessel 20. Shroud 30 may be cylindrical in shape with a circular annular cross-section; however, other suitable shapes may be used. Shroud 30 is coaxially aligned with the reactor vessel 20 along the longitudinal axis LA. The fuel core 26 may be located inside the shroud 30, and in one non-limiting embodiment nearer to the bottom 22 of the reactor vessel 20. Shroud 30 includes a top 34 and bottom 35 which may be spaced vertically apart from the bottom 22 of reactor vessel 20 to provide a flow passage into the shroud 30 at the bottom of the reactor vessel 20 (see, e.g. directional flow arrows FIGS. 1 and 8). In one embodiment as best shown in FIG. 8, the bottom 35 of the shroud 30 may be spaced apart from bottom 22 of reactor vessel 20 and supported by a plurality of radially oriented and circumferentially spaced apart support plates 42. Support plates 42 are configured to engage the reactor vessel bottom 22 at one extremity and bottom 35 of shroud 30 at another extremity. In one embodiment, support plates 42 may include one or more flow holes 41 to allow primary coolant to flow and circulate through the plates at the bottom of the reactor vessel. In other embodiments, the holes may be omitted.

The shroud 30 divides the internal cavity 25 of reactor vessel 20 into an outer annular space which defines a vertical downcomer region 28 (i.e. down-flow region) and an inner space which defines a vertical riser region 27 (up-flow region). Primary coolant flows downwards in reactor vessel 20 through the annular downcomer region 28, reverses direction and enters the bottom 35 of the shroud 30, and flows upwards through riser region 27 through the fuel core 26 where the primary coolant is heated for generating steam in an external steam generator.

In one embodiment, the shroud 30 may comprise an elongated outer shell 31, an inner shell 32, and a plurality of intermediate shells 33 disposed between the outer and inner shells. Shells 31-33 are cylindrically shaped in one embodiment. Shells 31-33 are concentrically aligned with respect to each other and spaced radially apart forming an array comprised of a plurality of relatively thin concentric annular cavities 40 between the outer and inner shell 31, 32. In one embodiment, the cavities 40 are fluid-filled with primary coolant, as further described herein. Annular cavities 40 extend longitudinally from the top 34 to bottom 35 of shroud 30. Accordingly, the annular cavities 40 have a length or height substantially coextensive with the length of the shells 31-33. The shells 31-33 may be formed of a suitable corrosion resistant metal, such as coated or stainless steel for example.

In one exemplary embodiment, the number of intermediate shells 33 may be at least two to provide at least three annular cavities 40. In non-limiting preferred embodiments, at least six or more intermediate shells 33 (divider shells) may be provided to divide the space between the inner and outer shells 32 and 31 into at least seven annular cavities 40. In one representative embodiment, without limitation, eight intermediate shells 33 are provided to create nine intermediate shells 33. The number of water-filled annular cavities 40 selected correlates to the insulating effect and heat transfer reduction from the inner shell 32 through the shroud to the outer shell 31. The number of intermediate shells 33 will be one less than the number of water-filled annular cavities 40 to be created.

Figure 2:
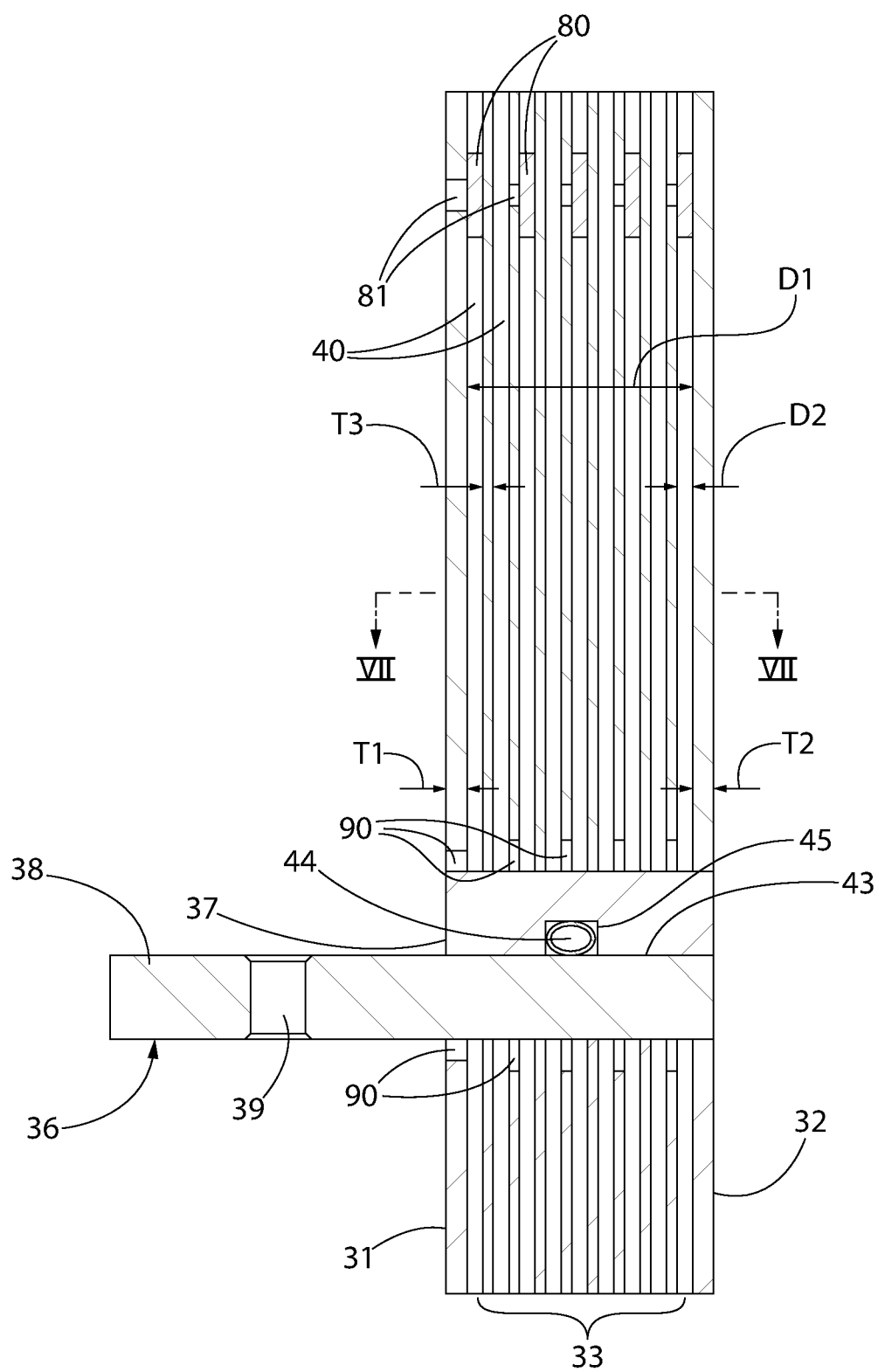
FIG. 2 is an enlarged cross section of a sidewall portion of the shroud of FIG. 1 at a joint between two adjoining stacked shroud sections.

In order to provide inter-shell connectivity and maintain the radial gap of annular cavities 40 between intermediate shells 33 and between the innermost and outermost intermediate shells and inner shell 32 and outer shell 31 respectively, spacers 80 may be provided as shown in FIG. 2. Spacers 80 are disposed in annular cavities 40 between the shells 31-33 and have a radial thickness sufficient to provide the desired radial width of each annular cavity. Each annular cavity 40 preferably includes spacers 80 in an exemplary embodiment. To retain the spacers 80 in their desired vertical position, the spacers may be rigidly attached to a shell 31-33 by any suitable means such as fusion welding in an exemplary embodiment. In one embodiment, a spot weld 81 may be used to attach spacer 80 to a shell 31-33 as shown. The spot welds 81 may have any suitable diameter, such as without limitation about 1 inch as a representative example. The number of spot welds 81 (spot nuggets) needed for joining neighboring shells 31-33 together may be estimated by the following empirical formula: Number=(shroud diameter times height (in inches)/100). Preferably, the spot welds 81 and spacers 80 should be spaced as uniformly as possible. In one embodiment, the spacers 80 may be radially staggered such that the spacers between adjacent shells 31-33 do not lie on the same radial axis (see, e.g. FIG. 2 showing a set of spacers aligned radially only in every other annular cavity 40). Other suitable arrangements of spacers 80 may be used. Spacers 80 may have any suitable shape, including circular or polygonal configurations. Preferably, spacers 80 may be formed of metal such as steel or other.

Figure 3:
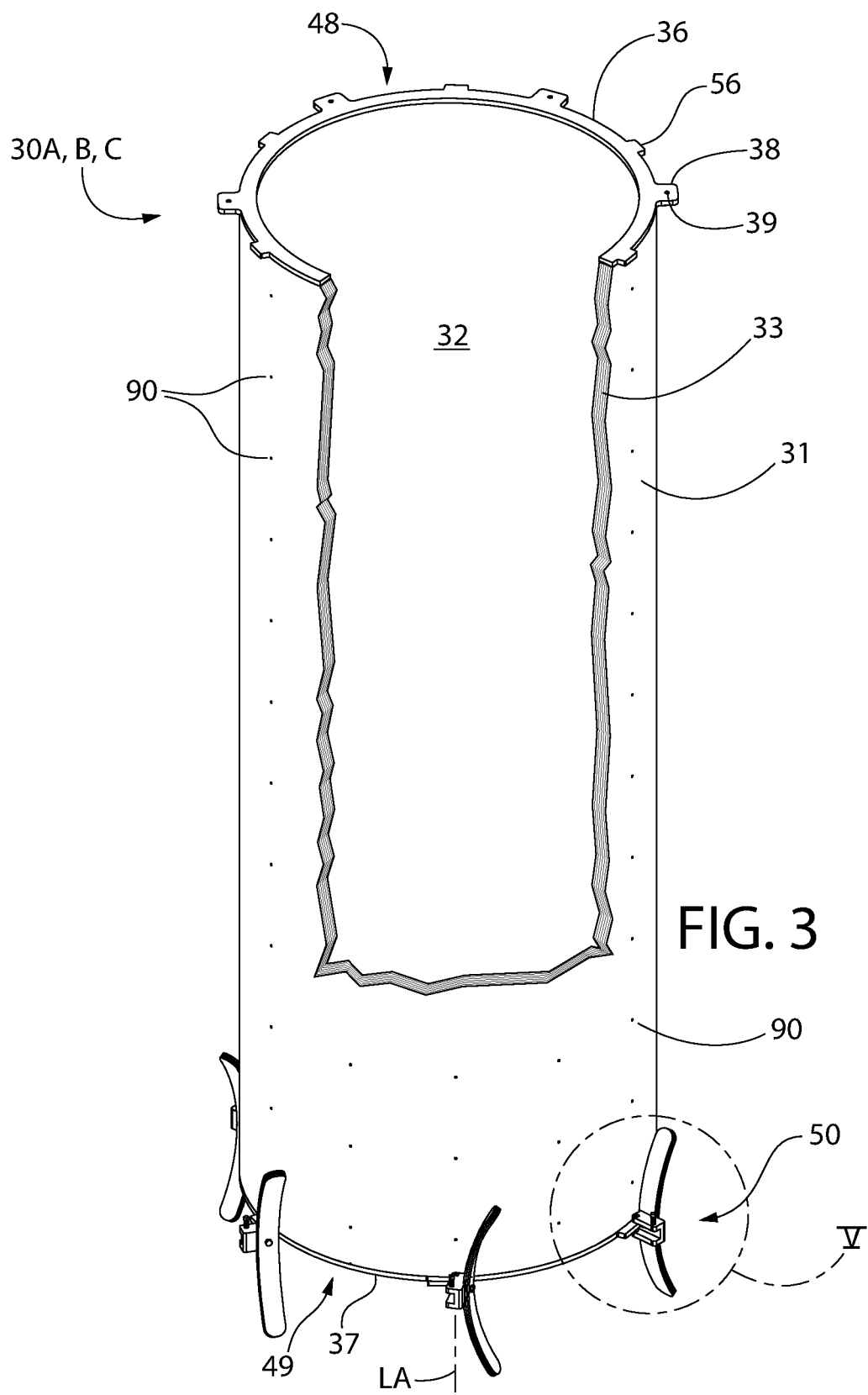
FIG. 3 is a top perspective view of a single shroud section.
Figure 7:
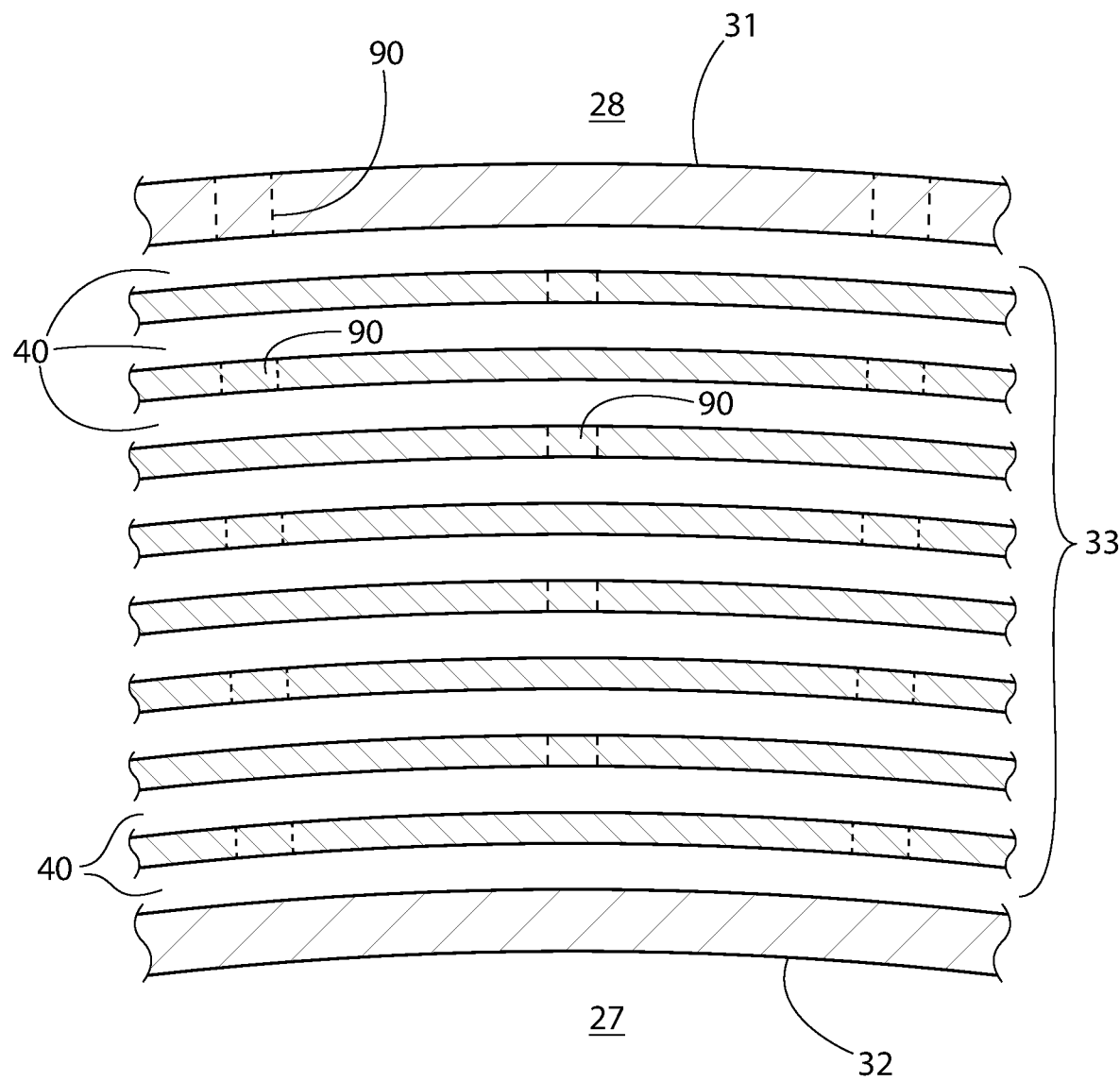
FIG. 7 is a transverse cross sectional view of a shroud section from FIG. 2.
Figure 8:
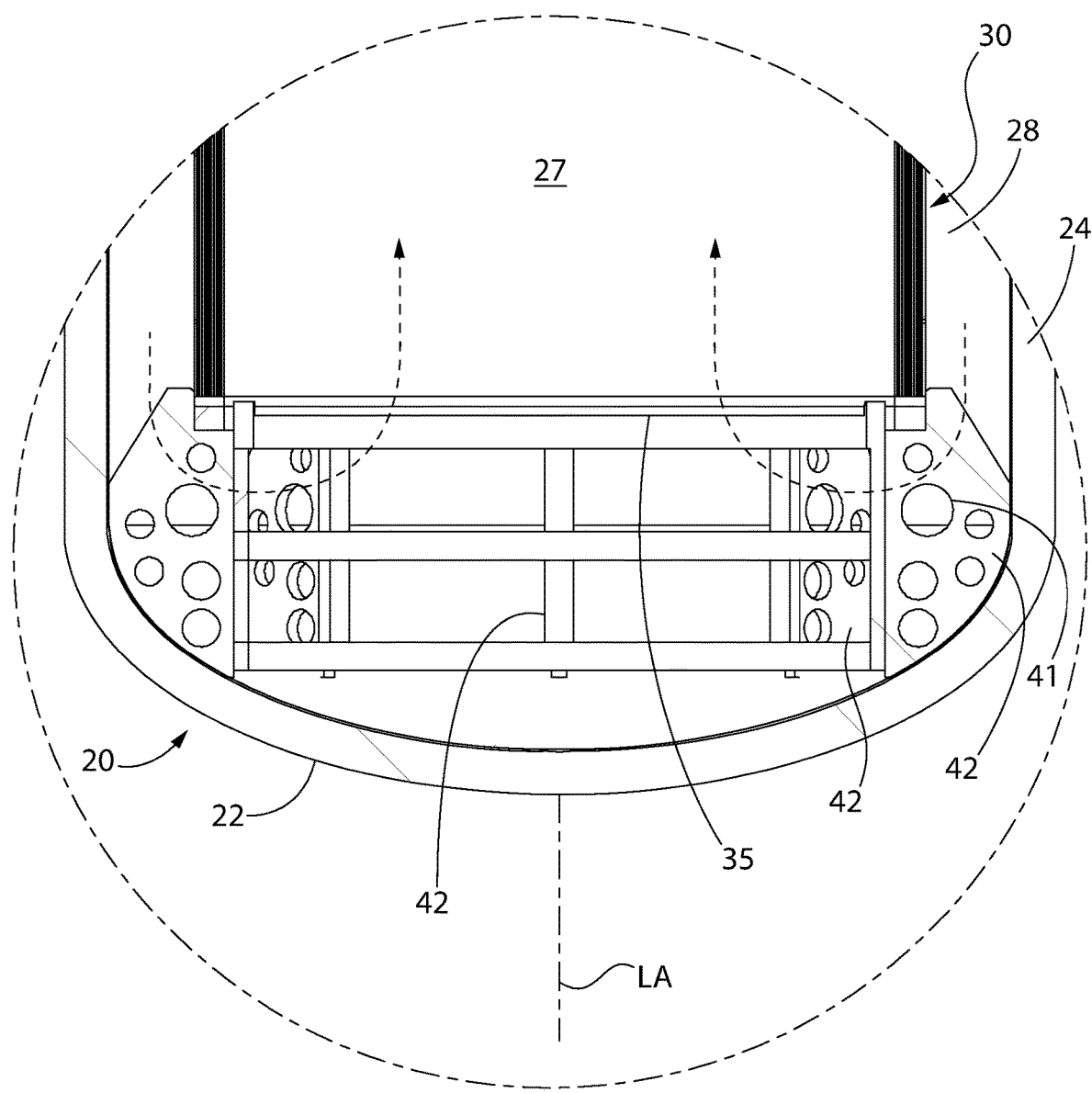
FIG. 8 is a detailed view of the bottom of the reactor shroud taken from FIG. 1.

Referring to FIGS. 2, 3, and 7, each annular cavity 40 may be connected to its adjoining cavities by one or more small fluid drain holes 90. Drain holes 90 are configured and arranged to hydraulically or fluidly interconnect all of the annular cavities 40. The outer shell 31 includes drain holes 90 which fluidly connect the outermost annular cavity 40 in shroud 30 to the annular downcomer region 28 in reactor vessel 20. This allows the primary coolant water to enter the outermost cavity 40 and then flow inwards successively through the plurality of drains holes in intermediate shells 33 for filling all the annular cavities with the fluid. Submerging the multi-shell shroud 30 body in the water-filled reactor vessel (e.g. demineralized primary coolant) will fill all of the internal annular cavities 40 with water and expel virtually all entrapped air, thereby creating water-filled annular cavities. In one arrangement, the drains holes 90 may be radially staggered as best shown in FIG. 7 so that the holes in one shell 31 or 33 do not radially align with holes in its neighboring shells. This forms a staggered flow path through the shroud 30. The inner shell 32 may not have drain holes 90 and is solid in one embodiment. Preferably, a plurality of drain holes 90 are spaced both circumferentially and longitudinally apart along the entire height or length of the shroud 30 in each shroud segment 30A-C Referring to FIG. 2, the inner and outer shells 32 and 31 may have thicknesses T2 and T1 respectively which are larger than the intermediate shells 33 in one embodiment to stiffen and strengthen the shroud 30. For example, in one representative example without limitation inner and outer shells 32 and 31 may have a plate thickness (T1 and T2) of about ¼ inch and intermediate shells 33 may have a thickness T3 of about ⅛ inch. Each annular cavity 40 has a depth D2 (measured in the radial direction transverse to longitudinal axis LA) which is less than the total depth D1 between the inner and outer shells 32 and 31. In one embodiment, the water-filled annular cavities 40 may have a depth D2 that is less than the thickness T1-T3 of the shells 31-33. In one representative example without limitation, the depth of cavity 40 may be about 3/16 inch. This arrangement provides a plurality of thin water films or chambers comprised of primary coolant sandwiched between the inner and outer shells 32 and 31 in the multi-shell weldment (MSW) shroud wall construction. The thin water films have an insulating effect for shroud 30 which minimizes heat transfer between the hot riser region 27 and colder downcomer region 28 (see FIG. 1). Advantageously, the water films eliminate the need for traditional insulation materials in the shroud which may be wetted or otherwise damaged.

In one embodiment, inner shell 32, outer shell 31, and intermediate shells 33 may have vertical heights or lengths which are substantially coextensive.

According to one aspect of the invention, the shroud 30 may comprise a plurality of vertically stacked and coupled shroud sections or segments 30A, 30B, and 30C. Referring to FIGS. 1 and 3, each shroud segment 30A-C includes an upper end 48, lower end 49, an annular top closure plate 36 attached to upper end 48, and an annular bottom closure plate 37 attached to lower end 49. The top closure plate 36 and bottom closure plate 37 may be formed of a suitable metal such as steel. Corrosion resistant closure plates 36, 37 formed of coated or stainless steel may be used. Within each shroud segment 30A-C, the annular cavities 40 and shells 31-33 extend longitudinally between the top and bottom closure plates 36 and 37, and may have coextensive lengths or heights.

The outer shell 31, inner shell 32, and intermediate shells 33 in each segment 30A-C may be rigidly attached to the top and bottom closure plates, such as via a rigid connection formed by welding for structural strength. In one embodiment, the shells 31-33 may be hermetically seal joined to the top and bottom closure plates such as with full circumferential seal welds. This forms a water-tight joint between the shells 31-33 and the top and bottom closure plates 36 and 37, respectively.

Each shroud segment 30A-C is a self-supporting structure which may be transported, raised, and lowered individually for ease of maneuvering and assembly to adjoining segments during fabrication of the shroud 30. To facilitate handling the shroud segments 30A-C individually, the top closure plates 36 may include radially extending lifting lugs 38 which include a rigging hole 39 for attachment of lifting slings or hoists. A suitable number of lifting lugs 38 circumferentially spaced apart at appropriate intervals are provided to properly and safely hoist the shroud segments 30A-C. The weight of each shroud segment 30A-C may be vertically supported by the shroud segment immediately below with the weight being transferred through the top and bottom closure plates 36 and 37, respectively. Accordingly, in some embodiments, the entire weight of the shroud segments 30A-C may be supported by support plates 42 (see, e.g. FIGS. 1 and 8).

In one embodiment, adjoining shroud segments 30A-C may be coupled together at joints 43 between segments via a plurality connectors 76 such as of clamps 50. Referring to FIGS. 1 and 3-5, clamps 50 are configured to detachably join and engage the bottom closure plate 37 of one shroud segment (e.g. 30B) to top closure plate 36 of the adjoining lower shroud segment (e.g. 30C). Clamps 50 each include a U-shaped body 51 defining a recess 52 configured to receive a mounting lug 55 formed on bottom closure plate 37 and a mating mounting lug 56 formed on top closure plate 36 as shown. Mounting lugs 55 and 56 are radially extending and circumferentially spaced apart on bottom and top closure plates 37 and 36, respectively. Each mounting lug 55 is arranged in a pair and coaxially aligned along the longitudinal axis LA with a corresponding mounting lug 56. In one embodiment, the mounting lugs 55 and 56 are integrally formed with and a unitary structural part of the bottom and top closure plates 37, 36. Accordingly, the mounting lugs 55, 56 may preferably be formed of metal similarly to bottom and top closure plates 37, 36 for structural strength.

In one arrangement, clamps 50 may each be pivotably connected to a mounting lug 55 on the bottom closure plate 37 by a pivot pin 54 which defines a pivot axis. Pivot pins 54 are oriented parallel to longitudinal axis LA so that the clamp 50 may be pivotably swung or moved transversely to the longitudinal axis LA between a closed locked position (see, e.g. FIG. 4) and open unlocked position (see, e.g. FIG. 5). In one embodiment, pivot pin 54 is disposed proximate to one end 58 of the clamp body 51 and the opposing end 57 is open to receive mounting lug 56 of a top closure plate 36 into recess 52. Pivot pin 54 extends axially through the mounting lug 55 and the bottom and top flanges 59, 60 of clamp 50.

Figure 4:
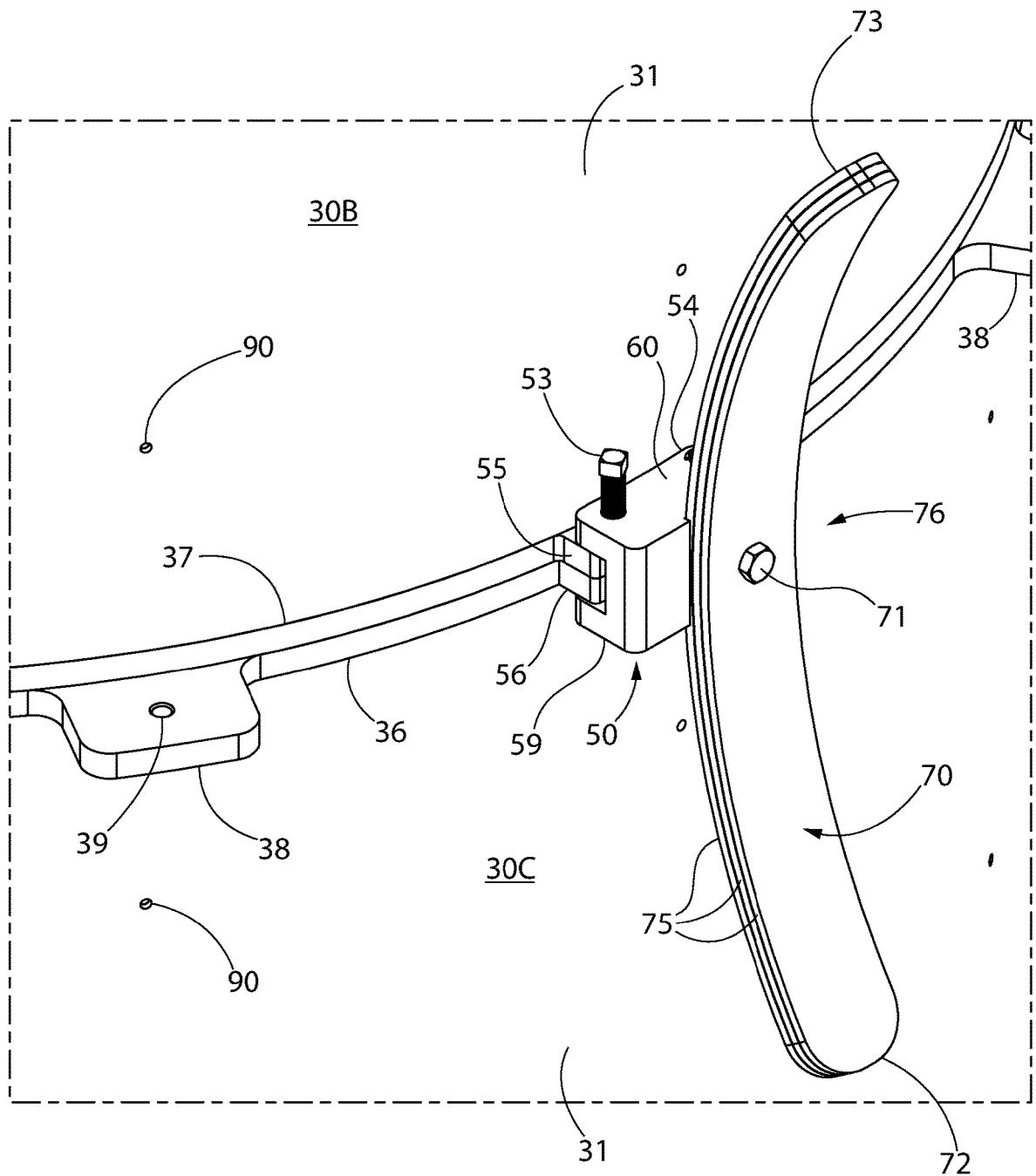
FIG. 4 is an enlarged perspective view a portion of a joint between two shroud sections showing a clamping mechanism in a locked or closed position.

To secure the clamp 50 in the closed locked position shown in FIG. 4, a locking fastener such as set screw 53 may be provided which is configured and arranged to engage a top surface of mounting flange 55. Set screw 53 may be threadably engaged in threaded bore 61 formed in top flange 60 of clamp 50. The bore 61 extends completely through top flange 60 to allow the bottom end of the set screw shaft to be projected into or withdrawn from clamp recess 51 for engaging or disengaging mounting flange 55. Raising or lowering the set screw 53 alternatingly disengages or engages the set screw with the mounting flange 55. Set screw 53 is preferably withdrawn from.

A method for assembling shroud 30 comprised of segments 30A-C using clamps 50 will now be described. For brevity, assembly of shroud segment 30B onto segment 30C will be described; however, additional shroud segments may be mounted in a similar manner Referring to FIG. 3, a pair of shroud segments 30B and 30C are provided each configured as shown. Clamps 50 are in the open unlocked position (see, e.g. FIG. 5). Shroud segment 30B is first axially aligned along longitudinal axis LA with segment 30C. Segment 30B may then be rotated as needed to axially align mounting flanges 55 on bottom closure plate 37 with mounting flanges 56 on top closure plate 36 of segment 30C. Each pair of mounting flanges 55 and 56 may be brought into abutting relationship. In the process, bottom closure plate 37 is brought into abutting contact with top closure plate 36 forming the joint 43 between segments 30B and 30C. Clamp 50 is then pivoted about pivot pin 54. Mounting flanges 55 and 56 are inserted into recess 51 of clamp 50 between flanges 59 and 60 (see, e.g. FIG. 5). The set screw 53 is then tightened to secure the clamp 50 in the closed locked position shown in FIG. 5. It will be appreciated that the order of performing the steps of the fore steps may be varied. In addition, numerous variations of the foregoing assembly process are possible.

Referring to FIG. 2, a sealing gasket 44 may be provided in between each pairing of a top closure plate 36 and bottom closure plate 37 to seal the interface at joint 43 therebetween. In one embodiment, the gasket 44 may be metallic formed of steel, aluminum, or another seal material suitable for the environment within a reactor vessel 20. The gasket 44 may be situated in an annular groove 45 formed in the bottom closure plate 37 as shown, or alternatively in the top closure plate 36 (not shown), to seal water seepage at the interface of joint 43 and also provide a certain level of verticality alignment capability during installation and joining of shroud segments 30A-C. In one embodiment, gasket 44 may be circular in transverse cross-section prior to the joint 43 being closed which will compress and deform the gasket.

Figure 5:
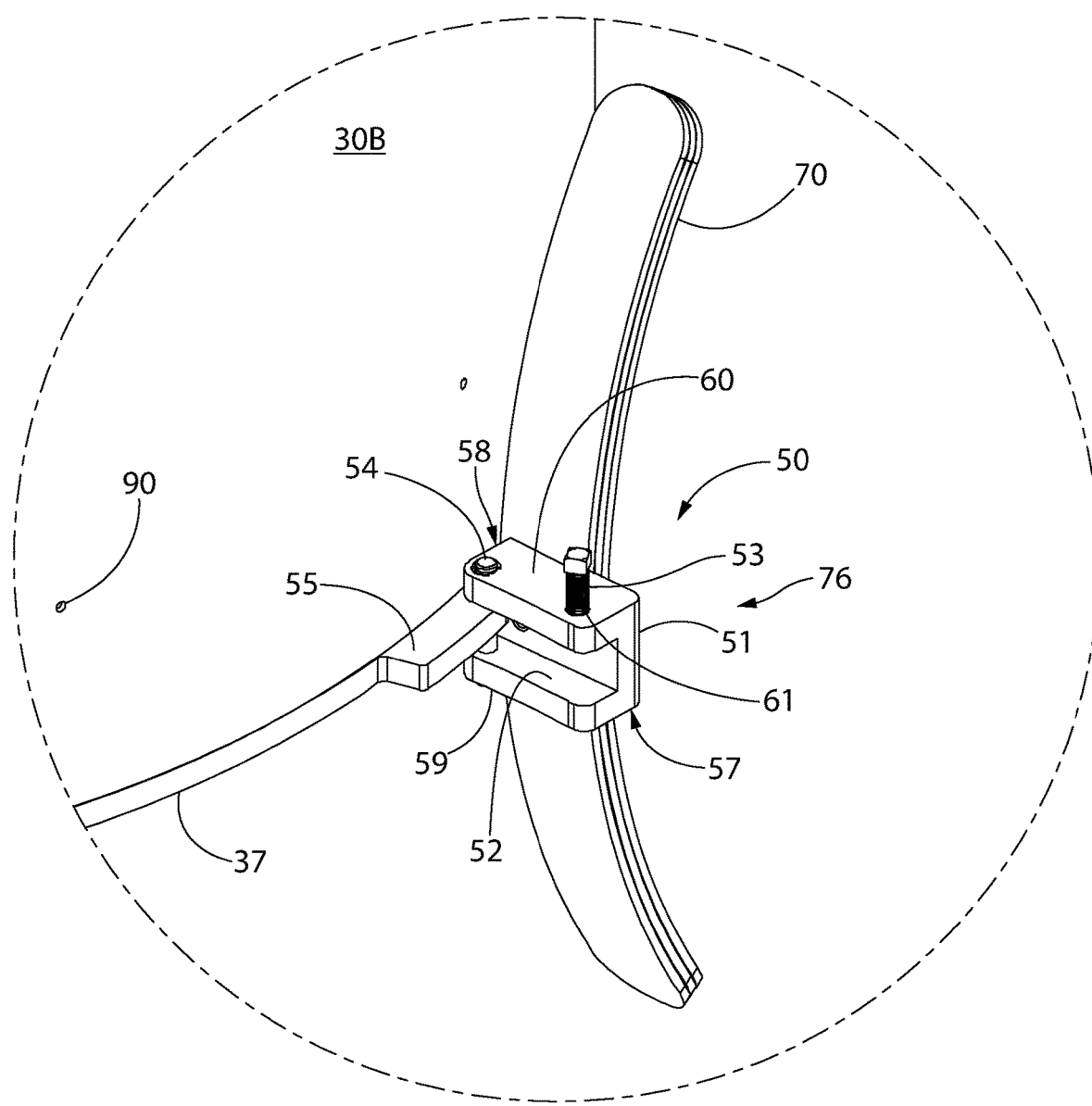
FIG. 5 is an enlarged perspective view of the bottom of a shroud section showing the clamping mechanism in an unlocked or open position.
Figure 6:
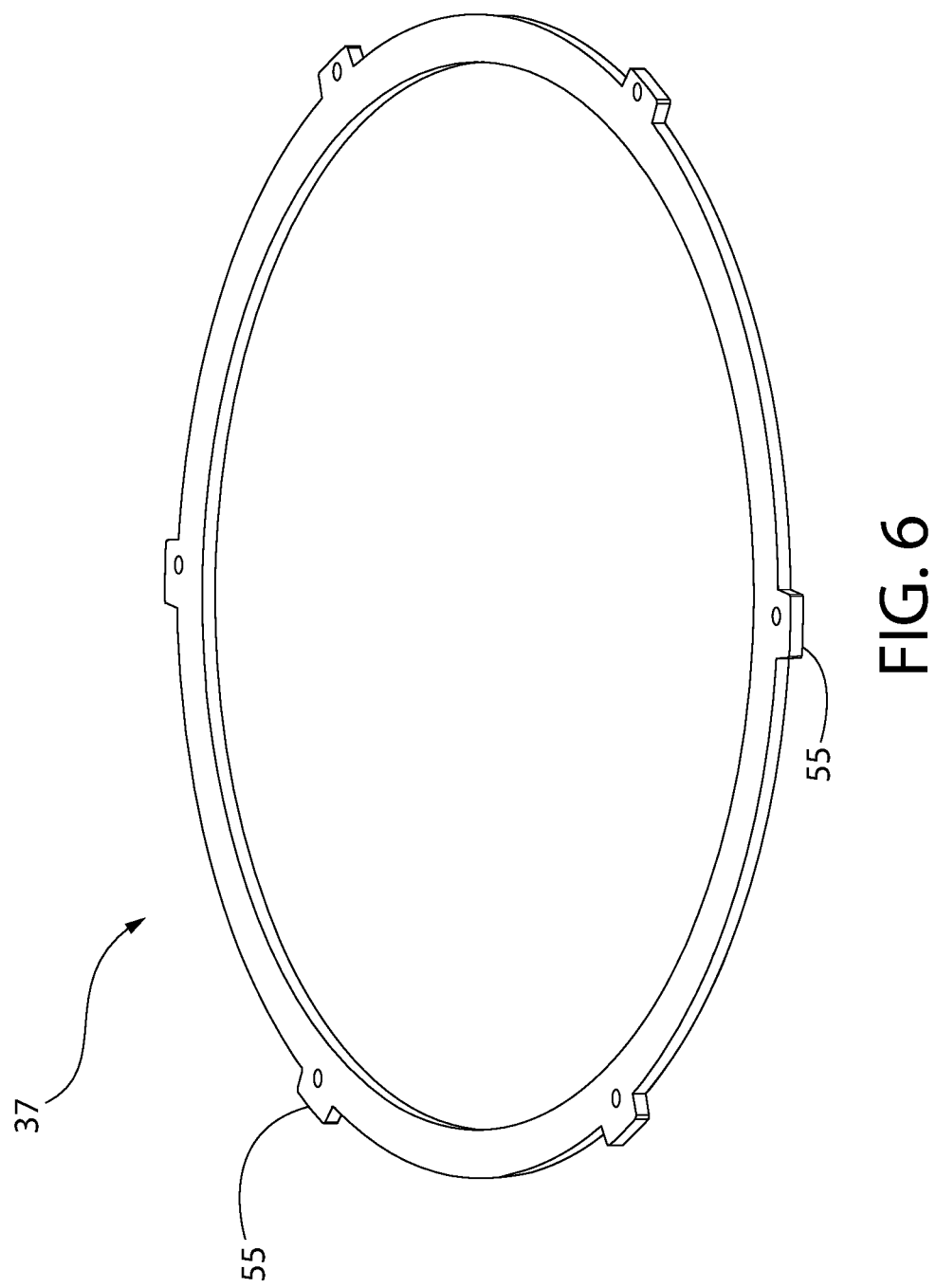
FIG. 6 is a perspective view of the annular bottom closure plate of the shroud of FIG. 1.

According to another aspect of the invention, a plurality of lateral seismic restraints such as restraint springs 70 may be provided to horizontally support and protect the structural integrity of the shroud 30 inside reactor vessel 20 during a seismic event. In one embodiment as shown in FIGS. 4 and 5, a dual purpose connector 76 (fastener or coupler for joints 43 between shroud segments 30A-C and lateral restraint) may be provided which combine the clamps 50 and seismic springs 70 into a single assembly.

Referring to FIGS. 1 and 3-5, seismic springs 70 are disposed between and engage shroud 30 and the interior surface 74 of the reactor vessel 20. A plurality of seismic springs 70 are provided which are circumferentially spaced apart on the outer shell 28 of the shroud 30. In one embodiment, the seismic springs 70 may be spaced apart at equal intervals.

Seismic springs 70 are elastically deformable to absorb lateral movement of the shroud 30. In one embodiment, each spring 70 may be in the form of an arcuate leaf spring comprised of a plurality of individual leaves 75 joined together to function as a unit. The leaves 75 may be made of suitable metal such as spring steel having an elastic memory. Other appropriate materials however may be used. The thickness and number of leaves 75 may be varied to adjust the desired spring force K of the spring 70. Seismic springs are arranged with the concave side facing outwards away from shroud 30 and towards reactor vessel 20 when in the fully mounted and active operating position. Opposing ends 72 and 73 of each seismic spring 70 are arranged to engage the interior surface 74 of reactor vessel 20.

In one embodiment, seismic springs 70 may be rigidly attached to shroud 30 to provide a stable mounting for proper operation and deflection of the spring to absorb energy during a seismic event. In one possible arrangement, seismic springs 70 may be rigidly attached to clamps 50 via a fastener 71 or another suitable mounting mechanism. Spring 70 may be fastened to clamp 50 at the midpoint between ends 72 and 73 in one embodiment. Accordingly, seismic springs 70 may be pivotably movable with clamps 50 in the manner already described herein. In FIG. 1, for example, the seismic spring 70 and clamp 50 shown between shroud segments 30A and 30B is in the open unlocked position. In this same figure, seismic springs 70 shown between shroud segments 30B and 30C are in the pivoted closed locked position in which the seismic springs 70 are in the active operating position with ends 72 and 73 engaged with the reactor vessel 20. During a seismic event when the shroud 30 may shift laterally/horizontally in one or more directions, the seismic springs 70 will deform and deflect assuming a more flattened configuration until the seismic load is removed, thereby returning the spring elastically to its original more arcuately-shaped configuration shown. In one embodiment, each joint 43 between shroud segments 30A, 30B, and 30C may include seismic springs 70 to horizontal support the shroud 30 intermittently along its entire height.

Underlying Operating Principle of the Shroud

The multi-shell weldment (MSW) design for shroud 30 described herein is based on the principle in applied heat transfer which holds that an infinitely tall and infinitesimally thin closed end cavity filled with water would approximate the thru-wall thermal resistance equal to that of the metal walls and the water layer conductances. The governing dimensionless quantity that provides the measure of departure from the ideal (conduction only) is Rayleigh number defined as the product of the Prandtl number (Pr) and the Grashof number (Gr).

Heat transfer in a differentially heated vertical channel of height H and gap L is characterized by Nusselt number correlation as a function of Rayleigh number as follows:

$$Nu=0.039Ra^{1/3}$$

Where:
Nu is Nusselt Number $(=hL/k)$
h is heat transfer coefficient
k is conductivity of water
Ra is Rayleigh number $(=g\beta\Delta TL^3\rho^2/\mu^2)*Pr$
g is gravitational acceleration
$\beta$ is coefficient of thermal expansion of water
$\Delta T$ is hot-to-cold face temperature difference
$\rho$ is density of water
$\mu$ is water viscosity
As Rayleigh number defined above exhibits an $L^3$ scaling it follows that gap reduction substantially affects Ra number. For example a factor of 2 gap reduction cuts down Ra number by a factor of 8 (almost by an order of magnitude). Thus engineering the shroud with small gaps has the desired effect of minimizing heat transfer. To further restrict heat transfer a multiple array of gaps are engineered in the shroud lateral space to have the effect of resistances in series. An example case is defined and described below to illustrate the concept.

EXAMPLE

A Small Modular Reactor (SMR), such as the SMR-160 available from SMR, LLC of Jupiter, Fla., may have a particularly long shroud (e.g. over 70 feet). In such a case, the principal design concerns are: ease of installation, removal, verticality of the installed structure, mitigation of thermal expansion effects and protection from flow induced vibration of the multi-wall shell. The design features, described below to address the above concerns for such an SMR, can be applied to any shroud design.

A. Narrow cavity geometry: The height of each shroud (e.g. shroud segments 30A-C) is approximately three times its nominal diameter. The innermost and outer most shells (e.g. shells 32 and 31) are relatively thick compared to the intermediate (inner) shells (e.g. shells 33). The water cavity is less than 0.1% of the shroud's height. The table below provides representative dimensions for demonstrating the concept:

| Dimensions of a typical shroud in SMR-160: | |
| --- | --- |
| Inner diameter | 71⅛ inch |
| Height (Shroud built in four stacked sections (segments), 3 × 20 ft. (lower) and 1 × 11 ft. (top)) | 71 ft. |
| Number of water annuli (cavities) | 9 |
| Thickness of inner most shell | ¼ inch |
| Thickness of outermost shell | ¼ inch |
| Thickness of interior shell walls | ⅛ inch |
| Thickness of water cavities | 3/16 inch |

B. Inter-shell connectivity: The number of spot nuggets (approximately 1 inch diameter) joining neighboring shells should be estimated by the following empirical formula: Number=(shroud diameter times height (in inches)/100). The spot welds should be spaced as uniformly as possible.

C. Handling: The top plate 36 of each shroud segment 30A-C is equipped with lift lugs 38 for handling and installation. Typically six lift lug locations, evenly spaced in the circumferential direction, will suffice.

D. Stacked construction: The multi-shell weldments (MSW) of shroud segments 30A-C are stacked on top of each other as shown in FIGS. 1 and 2. One or more round metallic gaskets 44 as described above are provided at the interface between the annular top and bottom closure plates 36, 37 of successive stacks of shroud segments 30A-C. The gaskets 44 situated in the annular grooves 45 in the bottom closure plate 37 serve to seal water seepage at the interface of joint 43 and also provide a certain level of verticality alignment capability.

E. Thermal expansion: The axial thermal expansion of a tall stack of shroud segments 30A-C will cause severe stresses in adjoining structures such as the return piping that delivers the reactor coolant from the steam generator to the reactor's outer annulus (downcomer). To mitigate the thermal stresses, the upper region of the shroud may be equipped with a multi-ply bellows type expansion joint.

F. Seismic restraints: The junctions or joints 43 of the MSW shroud segments 30A-C provide the "hard" locations to join them and to secure them against lateral movement during earthquakes. The dual purpose connector 76 (fastener and lateral restraint) design concept shown in FIGS. 3-5 comprising the clamps 50 and seismic springs 70 as described herein provide the joining and lateral restraint functionality. This dual purpose connector 76 has the following capabilities:

(i) The two interfacing closure plates 36 and 37 are prevented from significant rotation or separation from each other during earthquakes.
(ii) The connector 76 is amenable to remote installation and removal.
(iii) The connector 76 is equipped with the seismic springs 70 (e.g. leaf springs) to enable it to establish a soft contact or a small clearance with the reactor's inside wall under operating condition (hot).

A set of three connectors 76, equipment-spaced in the circumferential direction at each closure plate 36, 36 elevation, is deemed to be adequate for the SMR described above. Additional connectors may be employed in other reactor applications at the designer's option.

Performance assessment: The efficacy of the MSW design is demonstrated by the case of the SMR-160 described above. Calculations show that the decrease in the hot leg temperature (primary coolant inside shroud 30) using water-filled annular cavities 40 due to heat loss across the shroud is merely 0.355 deg. F. As a point of reference, the idealized temperature loss would be 0.092 deg. F. if the water layers were instead omitted and "solid," i.e., heat transferred only by conduction through the shroud. It can be seen that the Rayleigh effect, responsible for the movement of water in closed cavities, has been largely suppressed by the MSW design of shroud 30.

Extension to vessels and conduits: The concept of establishing a thin water layer inside pipes (hereafter called "water lining") carrying heated water is proposed to be employed at the various locations in the power plant where minimizing heat loss from the pipe is desired. For example, the lines carrying hot and cooled reactor coolant are water lined to limit heat loss. Water lining is achieved by the following generic construction:

(i) An inner thin walled (liner) pipe that is nominally concentric with the main pipe. The liner pipe has a few small holes to make the narrow annulus communicate with the main flow space.
(ii) The small gap between the main and liner pipes is held in place by small spacer nuggets attached to the outside surface of the liner pipe.
(iii) In piping runs subject to in-service inspection of pressure boundary welds, the liner pipe is discontinued at the location of such welds.

The foregoing water lining approach is also proposed to be used to reduce thermal shock to pressure retaining vessel/nozzle junctions (locations of gross structural discontinuity) where large secondary stresses from pressure exist. This is true of penetrations in the reactor vessel, steam generator as well as the superheater. Water lined pressure boundaries will experience significantly reduced fatigue inducing cyclic stresses which will help extend the service life of the owner plant.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A shroud segment for a nuclear reactor vessel, the shroud segment comprising:
   an elongated inner shell;
   an elongated outer shell;
   a plurality of elongated intermediate shells disposed between the inner and outer shells;
   the inner shell, outer shell, and intermediate shells being radially spaced apart forming a plurality of annular cavities for holding water;
   a top closure plate attached to the top of the shroud segment; and
   a bottom closure plate attached to the bottom of the shroud segment;
   wherein the top and bottom closure plates are configured for detachable coupling to adjoining shroud segments to form a stacked array of shroud segments;
   a mounting clamp pivotably attached to the bottom closure plate, the mounting clamp movable between an open unlocked position and a closed locked position; and
   an elastically deformable and arcuately shaped seismic restraint fixedly attached to the shroud segment;
   wherein the seismic restraint is a leaf spring fixedly attached to the clamp and pivotable with the clamp.

2. The shroud segment of claim 1, wherein the annular cavities extend from the top closure plate to the bottom closure plate.

3. The shroud segment of claim 1, wherein the annular cavities are fluidly interconnected by a plurality of drain holes extending through the intermediate shells.

4. The shroud segment of claim 3, wherein the drain holes are radially staggered between adjacent intermediate shells.

5. The shroud segment of claim 3, wherein the outer shell includes drains holes to fluidly connect the annular cavities to an exterior of the shell segment.

6. The shroud segment of claim 1, wherein the intermediate shells have a length that is coextensive with the length of the shroud.

7. The shroud segment of claim 1, wherein the mounting clamp is attached to a radially extending mounting lug on the bottom closure plate.

8. The shroud segment of claim 1, wherein the mounting clamp includes a recess configured to receive a mounting lug on a top closure plate of a second shroud segment.

9. The shroud segment of claim 1, wherein the mounting clamp includes a locking fastener for holding the mounting clamp in the closed locked position.

10. A shroud segment for a nuclear reactor vessel, the shroud segment comprising:
    an elongated inner shell;
    an elongated outer shell;
    a plurality of elongated intermediate shells disposed between the inner and outer shells;
    the inner shell, outer shell, and intermediate shells being radially spaced apart forming a plurality of annular cavities for holding water;
    a top closure plate attached to the top of the shroud segment;
    a bottom closure plate attached to the bottom of the shroud segment;
    wherein the top and bottom closure plates are configured for detachable coupling to adjoining shroud segments to form a stacked array of shroud segments;
    a mounting clamp pivotably attached to the bottom closure plate, the mounting clamp movable between an open unlocked position and a closed locked position; and
    an elastically deformable and arcuately shaped seismic restraint fixedly attached to the shroud segment;
    wherein the seismic restraint defines an outward facing concave recess, the seismic restraint configured to engage an interior of the reactor vessel when the shroud segment is mounted therein.

11. The shroud segment according to claim 1, wherein the intermediate shells each have a length that is coextensive with respective lengths of the inner and outer shells, and wherein the shroud segment forms a riser region inside the shroud segment.

12. The shroud segment of claim 11, wherein the inner, outer, and intermediate shells of the shroud segment are seal welded to the top and bottom closure plates collectively forming a self-supporting shroud segment structure.

13. The shroud segment of claim 1, wherein the top closure plate includes radially extending lifting lugs configured for rigging.

14. A shroud segment for a nuclear reactor vessel, the shroud segment comprising:
    an elongated inner shell;
    an elongated outer shell;

a plurality of elongated intermediate shells disposed between the inner and outer shells;

the inner shell, outer shell, and intermediate shells being radially spaced apart forming a plurality of annular cavities between the inner shell, outer shell, and intermediate shells configured for holding water;

a top closure plate attached to the top of the shroud segment; and a bottom closure plate attached to the bottom of the shroud segment;

wherein the annular cavities are fluidly interconnected by a plurality of drain holes formed through the outer shell and intermediate shells, the drain holes in the outer shell spaced longitudinally apart along a length of the outer shell, and the drain holes in the intermediate shells being spaced longitudinally apart along a respective length of each intermediate shell;

the top and bottom closure plates configured for detachable coupling to adjoining shroud segments to form a stacked array of shroud segments;

a mounting clamp configured to detachably couple to a top closure plate of an adjoining shroud segment;

the mounting clamp pivotably coupled to the bottom closure plate via a pivot pin extending through the bottom closure plate and defining a stationary pivot axis, the mounting clamp movable about the pivot axis between an open unlocked position and a closed locked position; and a locking fastener rotatably mounted to the bottom closure plate and operable to retain the mounting claim in the closed locked position.

15. The shroud segment of claim 14, wherein the inner shell does not include drain holes.

16. A shroud segment for a nuclear reactor vessel, the shroud segment comprising:

an elongated inner shell;

an elongated outer shell;

a plurality of radially spaced apart elongated intermediate shells disposed between the inner and outer shells;

a top closure plate attached to the top of the shroud segment and having an outer circumferentially-extending peripheral edge which is substantially flush in radial direction with the outer shell;

a bottom closure plate attached to the bottom of the shroud segment and having an outer circumferentially-extending peripheral edge which is substantially flush in radial direction with the outer shell;

wherein the top and bottom closure plates each comprise a plurality of mounting tabs protruding radially outwards beyond their respective peripheral edges, the mounting tabs being configured for coupling to mounting tabs of adjoining shroud segments to form a stacked array of shroud segments;

an outer annular cavity formed between the intermediate shells and the outer shell;

an inner annular cavity formed between the intermediate shells and the inner shell;

a plurality of intermediate annular cavities formed between the intermediate shells; and a mounting clamp pivotably attached to each of the mounting tabs of the bottom closure plate, the mounting clamps movable between an open unlocked position and a closed locked position;

wherein the inner, outer, and intermediate shells of each shroud segment is seal welded to their respective top and bottom closure plates collectively forming a self-supporting shroud segment structure, each shroud segment detachably coupled to an adjoining shroud segment.

* * * * *